Dec. 16, 1947.  H. H. ROBSON  2,432,682
VEHICLE CONTROL PEDAL
Filed Aug. 30, 1946  3 Sheets-Sheet 1
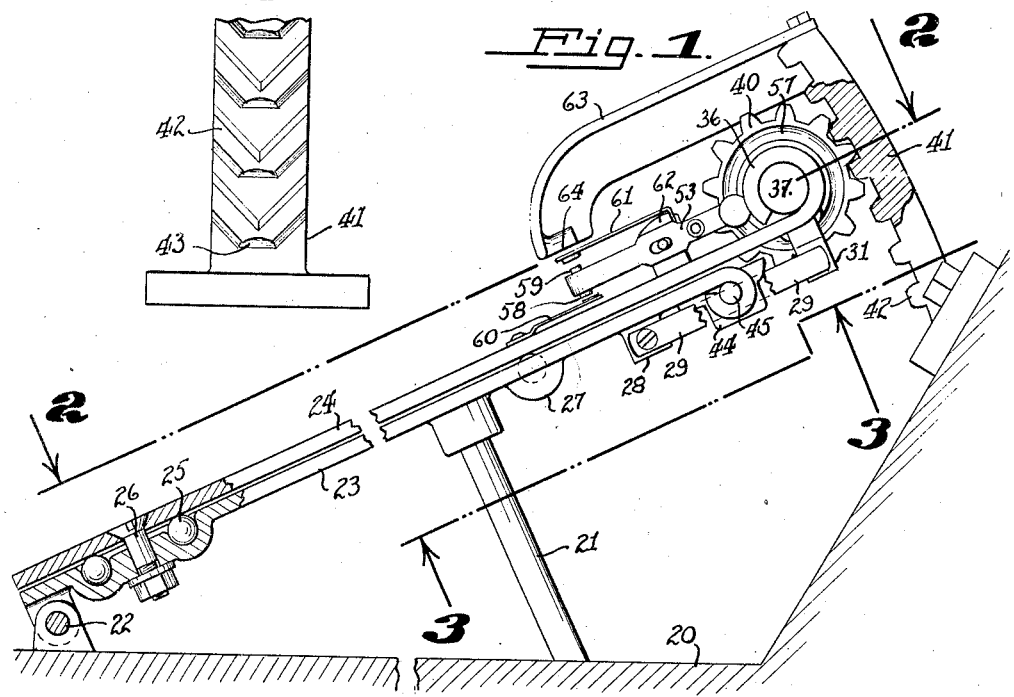
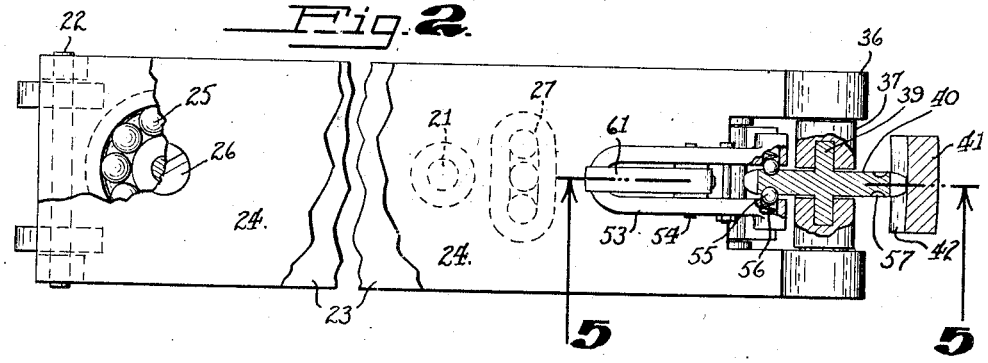
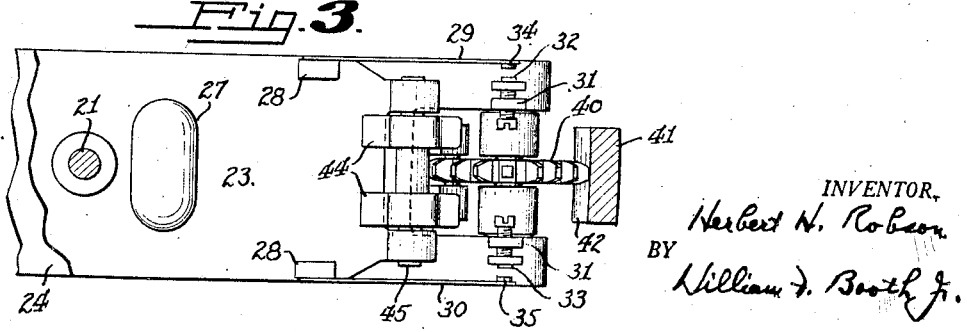
INVENTOR,
Herbert H. Robson
BY
William T. Booth Jr.
ATTORNEY.

Dec. 16, 1947.  H. H. ROBSON  2,432,682
VEHICLE CONTROL PEDAL
Filed Aug. 30, 1946   3 Sheets-Sheet 2
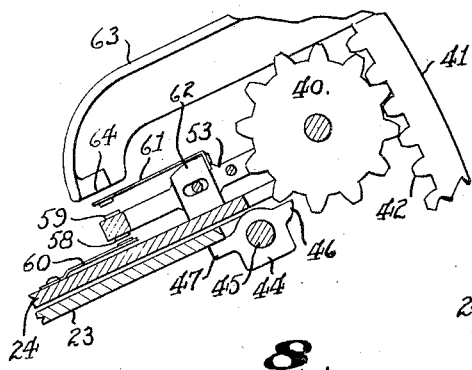
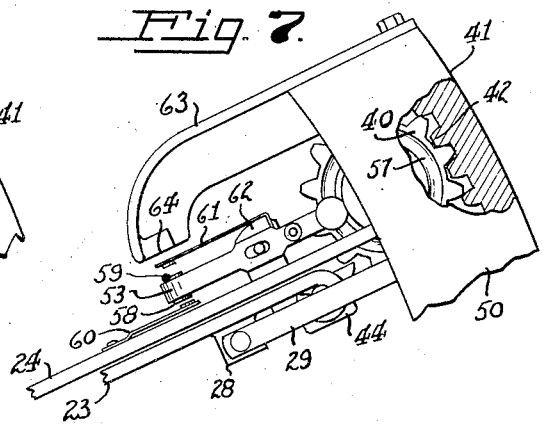
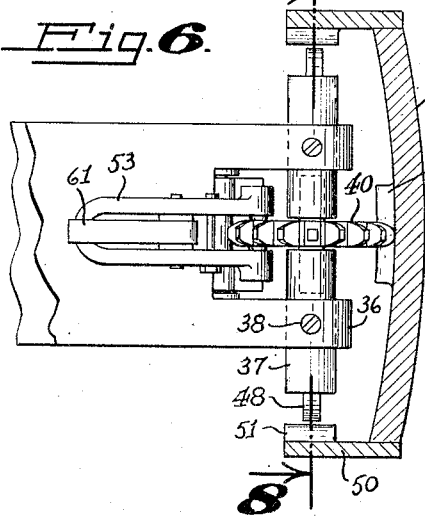
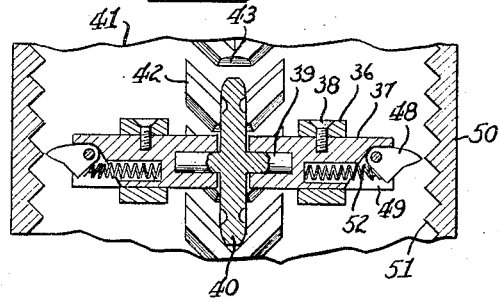
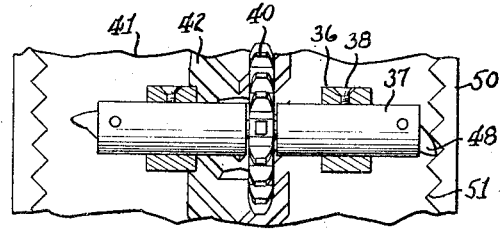
INVENTOR,
Herbert H. Robson
BY William T. Booth Jr.
ATTORNEY.

Dec. 16, 1947.  H. H. ROBSON  2,432,682
VEHICLE CONTROL PEDAL
Filed Aug. 30, 1946  3 Sheets-Sheet 3
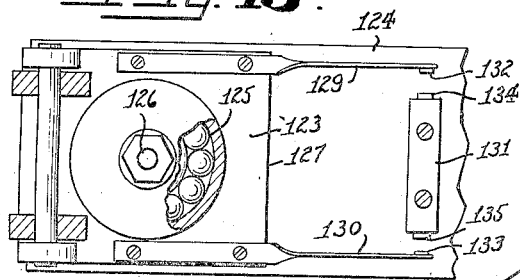
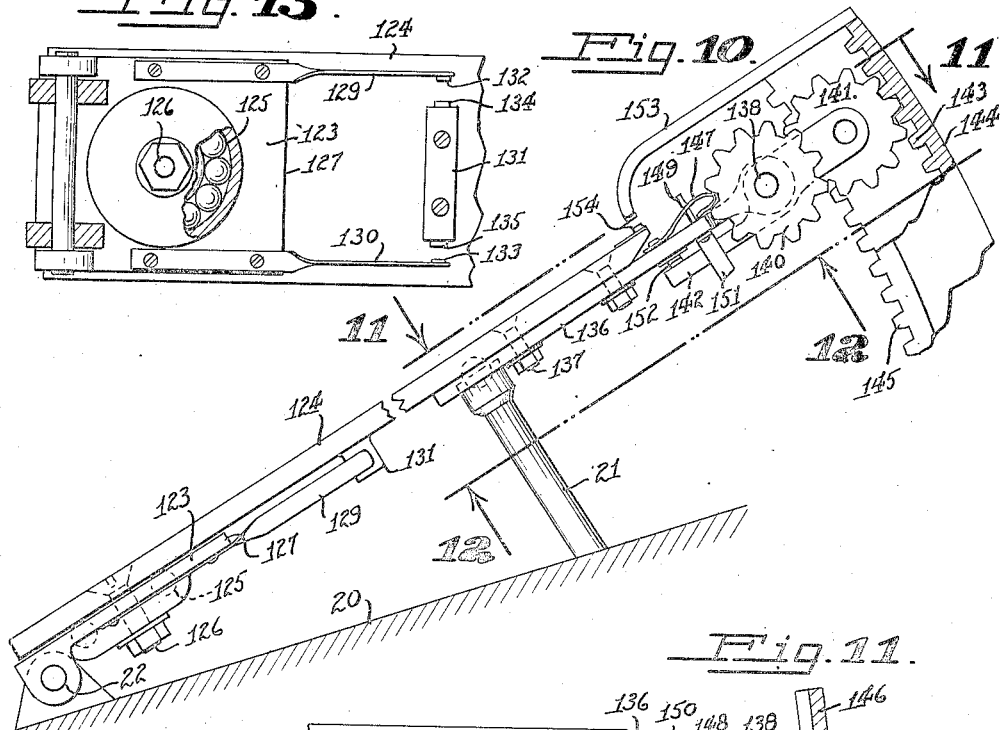
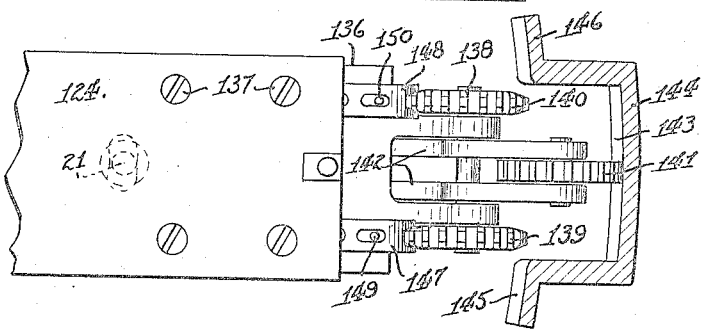
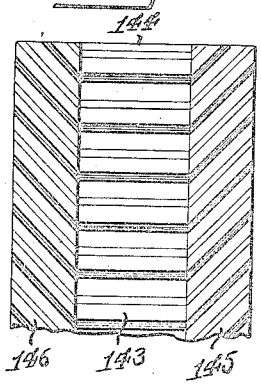
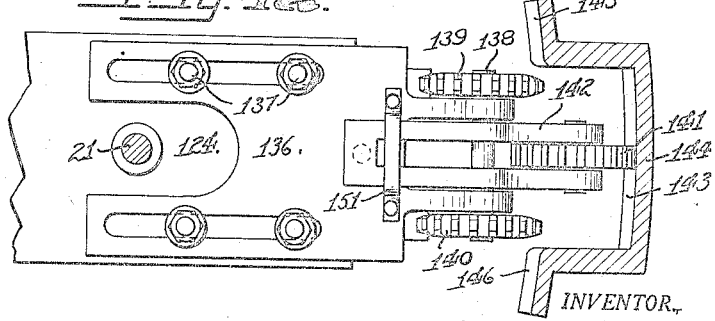
INVENTOR.
Herbert H. Robson
BY
William J. Booth Jr.
ATTORNEY.

Patented Dec. 16, 1947

2,432,682

UNITED STATES PATENT OFFICE 2,432,682

VEHICLE CONTROL PEDAL

Herbert H. Robson, San Leandro, Calif.

Application August 30, 1946, Serial No. 694,090

18 Claims. (Cl. 200—59)

The present invention relates to a vehicle control pedal by which the driver can control both the speed of the vehicle and the operation of signals for indicating turning, slowing and stopping.

The principal object of the invention is to provide means associated with the usual throttle or accelerator pedal of a motor vehicle which will automatically, and without conscious effort on the part of the driver, operate signals indicating right or left turn, slow, or stop.

The normal driver before initiating a turn will glance to the side toward which he intends to turn, with or without turning his head, in order to see whether the way is clear for him to make the intended turn. Reflex muscular action will cause him unconsciously to move his foot resting upon the control pedal laterally in the same direction toward which he turns his head or his eyes. The invention utilizes this unconscious reflex action of the foot by mounting the throttle pedal for lateral swinging movement, and by such lateral movement to operate electrical contacts for controlling right or left turn indicators.

A further object of the invention is to provide means automatically to return the pedal to its neutral position upon completion of the turn.

A further object of the invention is to provide contacts operated by the normal movement of the pedal for automatically indicating that the vehicle is about to slow down or stop. The indicating functions of the pedal are performed by means which do not interfere with its normal throttle controlling movements, and because the indicating functions are automatic and are performed without conscious effort on the part of the driver, no special skill or training is required, and the vehicle can be operated safely in the usual standard manner by anyone accustomed to driving.

Further objects and advantages of the invention will become apparent from the following specification, which should be read with the understanding that the form, construction and arrangement of the several parts may be varied within the limits of the claims hereto appended without departing from the spirit of the invention as defined in said claims.

Reference will be made to the accompanying drawings in which

Fig. 1 is a side elevation, partly broken and partly in section, of a vehicle throttle pedal embodying a preferred form of the invention.

Fig. 2 is a top view of the pedal, partly broken and partly in section, taken on the line 2—2 of Fig. 1.

Fig. 3 is a bottom view of a portion of the pedal partly in section taken on the line 3—3 of Fig. 1.

Fig. 4 is an elevation of the toothed quadrant or rack shown at the right of Fig. 1.

Fig. 5 is a vertical sectional detail taken on the line 5—5 of Fig. 2.

Fig. 6 is a top view of the end portion of the pedal with the rack shown in section, illustrating a form of automatic return mechanism omitted from Fig. 2.

Fig. 7 is a side view partly in section of the mechanism shown in Fig. 6.

Fig. 8 is a vertical sectional detail taken on the line 8—8 of Fig. 6.

Fig. 9 is a vertical detail partly in section of the parts shown in Fig. 8 showing the mechanism in laterally shifted position.

Fig. 10 is a side elevation, partly broken and partly in section, of a throttle pedal embodying a modified form of the invention.

Figs. 11 and 12 are respectively a top and bottom view of the forward portion of the same, taken on the lines 11—11 and 12—12 of Fig. 10.

Fig. 13 is a bottom view partly in section of the rear portion of the pedal shown in Fig. 10.

Fig. 14 is an elevation of the toothed quadrant or rack shown at the right of Fig. 10.

In the drawings, the reference numeral 20, Figs. 1 and 10, designates the floor of a motor vehicle, and 21 is the usual push rod which operates the throttle, being pushed down to open the throttle and being returned upward by a spring, not shown, in the usual manner. 22 is a hinge, mounted on the floor, upon which the rear end of the throttle or accelerator pedal is mounted.

The usual throttle pedal is replaced, in the form of the invention shown in Fig. 1, by a pedal comprising parallel lower and upper plates 23 and 24, the lower plate 23 being mounted on the hinge 22, which has a horizontal axis, and the upper plate 24 being mounted on said lower plate for lateral swinging movement by a bearing consisting of a series of balls 25 seated in an annular raceway formed in the lower plate surrounding a central pivot bolt 26 having a vertical axis. A second set of balls, operating in a transverse raceway 27 formed in the lower plate 23, gives additional support to the forward end of the upper plate 24. The upper plate, upon which the driver's foot rests, can thus move up and down, to operate the throttle rod 21 in the usual manner, and it can also swing from side to side to operate signal contacts now to be described. The axis of the pivot 26 is not truly vertical except when the pedal may be depressed to a horizontal position, but it is herein described as vertical to differentiate it from the horizontal axis of the hinge pivot 22.

Mounted on lugs 28 beneath the forward end of the lower plate 23 are spring fingers 29 and 30, Figs. 1 and 3, one at each side of said plate. Lugs 31 are secured beneath the forward end of the upper plate 24, and carry adjustable contact screws 32 and 33 respectively, which are positioned to make electrical contact with the contacts 34 and 35 of the fingers 29 and 30 when the upper plate is shifted to one side or the other from its normal central position. The two pairs of contacts, 32—34 and 33—35, are connected, by wires not shown, in suitable electric circuits to operate signals of any desired type indicating right and left turn respectively. Such circuits and signals being common and well known, they have been omitted from the drawings, as has been the necessary electrical insulation of the contact elements.

It will be readily understood that when the upper plate 24, upon which the driver's foot rests, is swung slightly to the right about the vertical pivot 26, the contacts 32—34 will be closed and a right turn signal will be operated, and when said upper plate is swung slightly to the left, the contacts 33—35 are closed and a left turn signal will be operated. Fig. 3 being a bottom view, the direction of movement appears reversed therein. When said upper plate is in its normal or middle position, neither set of contacts are closed, and neither signal is operated.

Means are provided for restoring the upper plate 24 to its normal position automatically after the turn has been completed. Advantage is taken of the fact that, in practically every case, the driver will allow the pedal to rise to close or partially close the throttle, and to reduce the speed of the vehicle, before entering the turn, and will not depress the pedal again, to open the throttle, until the turn has been completed. The mechanism now to be described is designed to allow the upper plate to be shifted laterally when the pedal is rising or held stationary, but to return it to normal position from either side when it is moved downwardly.

The forward end of the upper plate 24 is cut away, leaving two laterally spaced extensions 36, Figs. 1, 2, 6 and 8, which are bent around studs 37 and secured thereto by set screws 38 (Figs. 6 and 8). The inner spaced ends of the studs 37 are bored out to provide bearings 39 for the spindle of a sprocket 40, which is thus rotatably mounted at the forward end of the pedal.

A stationary rack or quadrant 41 is mounted on the floor 20 in position to engage the teeth of the sprocket 40. The teeth 42 of the rack 41 are of herring-bone shape, as shown in Fig. 4, with their apices down, and the apex of each tooth is cut out in a semicircular depression 43 on its lower side.

Two laterally spaced pawls 44, Figs. 1, 3 and 5, are pivotally mounted at 45 at the end of the lower plate 23, one of said pawls being positioned on each side of the sprocket 40. When the upper plate 24 is shifted laterally, the teeth of the sprocket 40 will engage one or the other of said pawls 44, and said sprocket will thereby be prevented from turning in a counterclockwise direction, while being permitted to turn freely in a clockwise direction. Fig. 5 best shows the sprocket and pawl relation. Each pawl has a forward lug 46 which engages the teeth of the sprocket, and a rear lug 47 which engages the forward end of the plate 23. Gravity holds the pawl in the position shown in Fig. 5, and returns it to such position after it has been rocked by the upward passing sprocket tooth.

The action of the sprocket 40, the rack teeth 42, and the pawls 44 can best be understood from a description of a typical operative movement. Assume the vehicle to be running on a straight level road. The driver's foot will be holding the pedal slightly depressed from its top position. He approaches a right turn, glances to the right to see that the road is clear, and unconsciously moves his foot to the right, shifting the upper plate 24 laterally and closing the contacts of the right turn indicator. The lateral shifting of the plate 24 causes the sprocket 40 to shift so that its teeth engage the inclined portions of the rack teeth 42, and also engage one of the pawls 44.

The next act of the driver is to allow the pedal to rise, to reduce speed. The sprocket, being free to turn clockwise, is retained in the side portion of the rack by the inclined teeth thereof, and turns freely as the pedal rises. (The driver will still be unconsciously pressing his foot toward the right, because he has his mind on the approaching turn, and his reflex muscular action is causing his body to brace itself against said turn.) The upper plate, therefore, remains shifted toward the right, and the right turn indicator continues to operate.

When the turn has been completed, the driver depresses the pedal to open the throttle and regain speed. The sprocket, being prevented from rotating counterclockwise, must slide down the inclined teeth of the rack toward the middle, thereby shifting the upper plate laterally to its normal position and opening the contacts 32—34 to restore the right turn indicator to inoperative condition. Thus the first downward movement of the pedal automatically inactivates the turn signal and restores the upper plate to normal middle position, in which the sprocket rotates freely on both up and down movements. The semicircular notches 43 at the apices of the rack teeth keep the sprocket traveling in the middle of the rack on the upward movement of the pedal.

Additional means may be provided if desired for positively restoring the upper plate 24 to its normal middle position upon the downward movement of the pedal. Such additional means, shown in Figs. 6, 7, 8 and 9, comprise a pair of pawls 48 pivotally mounted in slots 49 in the ends of the sprocket studs 37, and a pair of plates 50 secured to the side edges of the rack 41 and having inwardly facing teeth 51. The pawls 48 are pressed outwardly by springs 52, and are so formed and mounted as to move downwardly but not upwardly from their horizontal positions shown in Fig. 8. When the upper plate 24 is shifted to one side, as shown in Fig. 9, the pawl 48 on that side engages the stationary teeth 51. The pedal can then move upwardly freely, the pawl swinging down as it passes each tooth, but when the pedal moves down, the pawl engages the teeth 51 and pushes the upper plate 24 laterally to its normal middle position, shown in Fig. 8, in which both pawls are free from the stationary teeth 51.

My control pedal includes two sets of electrical contacts for operating respectively a slow signal and a stop signal. As in the case of the turn signals previously described, the slow and stop signals may be of any well known type, and consequently have been omitted from the drawings. The circuits for operating them, and the insulation and leads of the contacts, being matters of standard construction, have likewise been omitted.

The slow signal is operated automatically by upward movement of the pedal, from any depressed position, and the stop signal is operated automatically when the pedal reaches its uppermost position. Both sets of contacts are opened when the pedal is depressed. In order that the signals may not remain operative when the vehicle is standing with its engine stopped, it is contemplated that their controlling circuits will be connected with the ignition switch in such a manner that they are de-energized when said switch is in off position.

For operating the slow and stop contacts, a rocker arm 53, Figs. 1 and 2, is provided, in the form of a yoke mounted on a pivot 54 on top of the upper plate 24. The front ends of the rocker yoke straddle the sprocket 40, and have balls 55 which are pressed by springs 56 into frictional contact with annular grooves 57 formed in the side faces of said sprocket. The yoke is thereby rocked by the turning of the sprocket. The pivot 54 operates in slots in the arms of the yoke, as shown, to enable the balls 55 to track in the annular grooves of the sprocket.

The rear end of the rocker 53 has lower and upper contacts 58 and 59. The lower contact 58 cooperates with a spring contact finger 60 mounted on the plate 24, said contacts 58—60 being closed when the sprocket turns clockwise upon upward movement of the pedal, and opened when the sprocket turns counterclockwise upon downward movement of the pedal. The contacts 58—60 operate the slow signal, not shown.

The upper contact 59 of the rocker cooperates with a spring contact finger 61 mounted on the bracket 62 which supports the rocker. A stationary arm 63, which serves as a cover for the sprocket and its associated mechanism, extends rearwardly from the top of the rack 41, and has its rear end 64 forming an abutment against which the spring contact 61 strikes and by which it is depressed when the pedal is in its extreme upper position. In Fig. 1 the pedal is shown slightly depressed. When it moves up to its limit, the contacts 59—61 are closed by downward bending of the spring finger 61, and said contacts are opened upon the first downward movement of the pedal. The contacts 59—61 control the stop signal, not shown.

It will be understood from the foregoing that when the driver allows the pedal to rise to reduce speed, the clockwise rotation of the sprocket rocks the rear end of the yoke 53 downwardly, thereby closing the contacts 58—60 and operating the slow signal (not shown). When the driver allows the pedal to rise to its limit, as he would when about to stop, the contacts 59—61 are closed by the abutment of the spring finger 61 against the fixed member 64, thereby operating the stop signal (not shown). When the pedal is again depressed, both sets of contacts are opened, inactivating the signals.

A modified form of pedal is shown in Figs. 10 to 14, which performs the same functions as described above in the same sequence. The mechanism, however, differs slightly from that heretofore described.

The mounting of the pedal on the floor board 20, by means of the hinge 22, so that it moves up and down to operate the throttle rod 21, is the same as in the previous form. The pedal comprises lower and upper plates 123 and 124, and the upper plate 124 is mounted to oscillate laterally on a ball bearing 125 about a center pin 126, as before. The lower plate 123, however, is short, ending at 127 slightly forward of the bearing 125. Two spring fingers 129 and 130 are secured to said lower plate and carry electrical contacts 132 and 133 which cooperate with stationary contacts 134 and 135 carried at the ends of a suitable insulating block 131 mounted on the bottom of the upper plate 124. When the upper plate is in normal or middle position, as shown in Fig. 13, neither set of contacts is closed, but when it is swung to one side or the other, either the contacts 132—134 or the contacts 133—135 are closed. The contacts 132—134 operate a right turn signal, and the contacts 133—135 operate a left turn signal, neither of said signals being shown.

An extension 136 is secured by bolts 137 to the forward end of the upper plate 124. A transverse spindle 138 is mounted at the forward end of said extension, and carries two laterally spaced sprockets 139—140. A third sprocket 141 is mounted forwardly of and between the sprockets 139 and 140, in a rocker frame 142 which is pivoted on the spindle 138. The center sprocket 141 is in constant mesh with the horizontal rack teeth 143 of a quadrant 144 fixed to and rising from the floor board. The quadrant also has two side racks 145 and 146, whose teeth are formed at downwardly and inwardly sloping angles, as shown in Fig. 14. The racks 145 and 146 are engaged by the respective sprockets 139 and 140 when the upper plate is swung to the right or left.

Pawls 147 and 148 are mounted on pins 149 and 150 on the extension plate 136, for engagement with the sprockets 139 and 140, and are arranged to permit clockwise rotation of said sprockets, but to prevent counterclockwise rotation thereof. The sprockets 139 and 140 perform the same functions as the single sprocket 40 of the previously described form of apparatus, i. e. they shift the upper plate back to normal or middle position when the pedal is moved downwardly, but allow it to remain in either side position when the pedal is moving upwardly. Operation of the pedal and its control of the turn signals, is therefore the same as in said previously described form of apparatus.

The rocker frame 142, which carries the center sprocket 141 and is pivoted about the spindle 138, is limited in its rocking motion in one direction by its rear end abutting against the under side of the extension 136 and in the other direction by a stirrup 151 which underlies said rear end. A pair of cooperating electrical contacts 152 are mounted on the rear end of the rocker frame and on the under side of the extension 136, and said contacts operate a slow signal, not shown. When the pedal is moved downwardly, the contacts 152 are open, and the slow signal is inoperative, but when the pedal is allowed to rise, to close the throttle and reduce speed, the rocker frame 142 swings upwardly at its rear end, closing said contacts and operating the slow signal.

A fixed arm 153, which is wide enough to serve as a cover for the sprockets and their associated mechanism, extends rearwardly from the top of the quadrant 144. A pair of cooperating electrical contacts 154, mounted on said arm and on the pedal plate 124, are suitably connected to operate a stop signal, not shown. The contacts 154 are open except when the pedal rises to its upper limit, whereupon they close to operate said stop signal.

It will be seen from the foregoing that the operation of the modified form of apparatus shown in Figs. 10 to 14 is the same as that of the form shown in Figs. 1 to 9. Right and left turn signals are operated by the respective contacts 132—134 and 133—135 when the upper plate 124 of the pedal is swung to the right or left, and said plate is restored to its normal middle position automatically when the pedal is depressed by one of the locked sprockets 139 or 140 sliding out of the inclined rack teeth 145 or 146. The slow signal is operated by the closing of the contacts 152 whenever the pedal is allowed to rise, from any position, and the stop signal is operated by the closing of the contacts 154 when the pedal rises to its upper limit.

I claim:

1. A vehicle control pedal comprising upper and lower members, the upper member being formed as a rest for the foot of the operator, a pivotal mounting near the rear end of the pedal enabling its forward end to move up and down to control the movement of the vehicle, a pivotal connection between said members enabling the upper member to swing laterally upon the lower member, electrical contacts mounted respectively on the upper and lower members operated by the lateral swinging movement of the upper member, and means actuated by the up and down movement of the pedal for restoring the upper member to its normal middle position.

2. A vehicle control pedal comprising a pedal member mounted for up and down rocking movement about a horizontal axis and for lateral swinging movement about a vertical axis away from a normal position, electrical contacts operated by said lateral swinging movement, a stationary member adjacent to said pedal member, and means mounted on the pedal for engagement with said stationary member to restore said pedal to its normal lateral position.

3. A vehicle control pedal comprising a pedal member mounted on the floor of the vehicle for up and down movement and for lateral movement in both directions from a normal position, electrical contacts operated by said lateral swinging movement, a stationary member rising from the floor of the vehicle adjacent said pedal, said stationary member having teeth, and means mounted on the pedal for engagement with the teeth of said stationary member to restore the pedal to said normal position.

4. A vehicle control pedal comprising a pedal member mounted for up and down movement and for lateral movement in both directions from a normal position, electrical contacts operated by said lateral movement, a stationary member positioned adjacent to the pedal, said stationary member having rack teeth sloping from both sides toward its vertical center line, rotatable sprocket means mounted on the pedal having teeth engaging said rack teeth and travelling along the vertical center line thereof when the pedal is in normal position, and means mounted on the pedal for engagement with said sprocket means to prevent rotation thereof in one direction.

5. Vehicle control means comprising a pedal mounted for up and down movement, a stationary member mounted adjacent to the pedal, mechanism mounted on the pedal including a member movable with respect to the pedal and means positioned to engage said stationary member, said engagement causing said movable member to shift its position with respect to the pedal upon a change in the direction of movement of said pedal, and electrical contacts actuated by the relative movement between said movable member and the pedal.

6. Vehicle control means comprising a pedal mounted for up and down movement, a stationary member having teeth mounted adjacent to the pedal, mechanism mounted on the pedal including a sprocket engaging the teeth of said stationary member and a rocker member, connecting means between said sprocket and said rocker member whereby said rocker member is caused to shift its position with respect to the pedal upon reversal of the direction of rotation of said sprocket, and electrical contacts actuated by the relative movement between said rocker member and the pedal.

7. Vehicle control means comprising a pedal mounted for up and down movement, a stationary member adjacent to said pedal having means engaged by the pedal at the upper limit of its movement, electrical contacts actuated by said engagement, mechanism mounted on the pedal including a member movable with respect to the pedal and means positioned for engagement with said stationary member during the up and down movement of the pedal, the last mentioned engagement causing said movable member to shift its position with respect to the pedal upon a change in direction of the up and down movement thereof, and electrical contacts actuated by the relative movement between said movable member and the pedal.

8. Vehicle control means comprising a pedal, a hinge mounting for said pedal enabling its forward end to move up and down, a stationary member having rack teeth positioned adjacent to the forward end of the pedal, mechanism mounted on the pedal including a sprocket engaging the teeth of said stationary member and a rocker member, connecting means between said sprocket and said rocker member whereby said rocker member is caused to shift its position with respect to the pedal upon reversal of the direction of rotation of said sprocket, electrical contacts actuated by the relative movement between said rocker member and the pedal, a hood carried by said stationary member positioned above said mechanism and the forward end of the pedal, a portion of said hood being engaged by the pedal at the upper limit of its movement, and electrical contacts actuated by the last mentioned engagement.

9. Vehicle control means comprising a pedal mounted for up and down rocking movement about a horizontal axis and for lateral swinging movement about a vertical axis away from a normal position, electrical contacts actuated by said lateral swinging movement, a stationary member adjacent to the pedal, mechanism mounted on the pedal including a rocker member movable with respect to the pedal and means positioned to engage said stationary member, said engagement restoring said pedal to its normal lateral position and causing said rocker member to move with respect to the pedal, and electrical contacts actuated by the relative movement between said rocker member and the pedal.

10. Vehicle control means comprising a pedal mounted for up and down rocking movement about a horizontal axis and for lateral swinging movement about a vertical axis away from a normal position, electrical contacts actuated by said lateral swinging movement, a stationary member adjacent to said pedal having means engaged by the pedal at the upper limit of its movement, electrical contacts actuated by said engagement, mechanism mounted on the pedal including a member movable with respect to the pedal and means positioned for engagement with said stationary member during the up and down movement of the pedal, the last mentioned engagement causing said movable member to shift its position with respect to the pedal upon a change in direction of the up and down movement thereof, and electrical contacts actuated by the relative movement between said movable member and the pedal.

11. Vehicle control means comprising a pedal mounted for up and down movement and for lateral movement in both directions from a normal position, electrical contacts operated by said lateral movement, a stationary member having rack teeth of herringbone shape sloping downwardly from both sides toward the center, a sprocket mounted on the pedal, said sprocket engaging the central portion of said rack when the pedal is in its lateral normal position and engaging the sloping portions of said rack when the pedal is shifted laterally from said normal position, and a pair of laterally spaced pawls mounted on the pedal and positioned to engage said sprocket only when it is traveling on the sloping portions of said rack, said pawls being mounted to prevent rotation of said sprocket when the pedal is moved downwardly, whereby it is shifted laterally to normal position by the sloping teeth of said rack.

12. Vehicle control means comprising a two-part pedal mounted for up and down movement, one part being shiftable laterally with respect to the other part, electrical contacts operated by said lateral shifting movement, a stationary member having rack teeth of herringbone shape sloping downwardly from both sides toward the center, a sprocket carried by the shiftable part of the pedal, said sprocket engaging and traveling on the central portion of said rack when the shiftable pedal part is in its normal position and engaging and traveling on the sloping portions of said rack when said pedal part is shifted laterally from said normal position, and a pair of laterally spaced pawls mounted on the non-shiftable pedal part for engagement with said sprocket when the shiftable pedal part is moved laterally, said pawls preventing rotation of the sprocket when the pedal is moved downwardly, whereby the shiftable part is returned to normal position by the sloping teeth of the rack.

13. Vehicle control means comprising a two-part pedal mounted for up and down movement, one part being shiftable laterally with respect to the other part, electrical contacts operated by said lateral shifting movement, a stationary member having rack teeth of herringbone shape sloping downwardly from both sides toward the center, a sprocket carried by the shiftable part of the pedal, said sprocket engaging and traveling on the central portion of said rack when the shiftable pedal part is in its normal position and engaging and traveling on the sloping portions of said rack when said pedal part is shifted laterally from said normal position, a pair of laterally spaced pawls mounted on the non-shiftable pedal part for engagement with said sprocket when the shiftable pedal part is moved laterally, said pawls preventing rotation of the sprocket when the pedal is moved downwardly, whereby the shiftable part is returned to normal position by the sloping teeth of the rack, a rocker member mounted on the shiftable pedal part and engaging said sprocket, said rocker being moved by a change in the direction of rotation of said sprocket, and electrical contacts actuated by the movement of said rocker.

14. Vehicle control means comprising a two-part pedal mounted for up and down movement, one part being shiftable laterally with respect to the other part, electrical contacts operated by said lateral shifting movement, a stationary member having rack teeth of herringbone shape sloping downwardly from both sides toward the center, a sprocket carried by the shiftable part of the pedal, said sprocket engaging and traveling on the central portion of said rack when the shiftable pedal part is in its normal position and engaging and traveling on the sloping portions of said rack when said pedal part is shifted laterally from said normal position, a pair of laterally spaced pawls mounted on the non-shiftable pedal part for engagement with said sprocket when the shiftable pedal part is moved laterally, said pawls preventing rotation of the sprocket when the pedal is moved downwardly, whereby the shiftable part is returned to normal position by the sloping teeth of the rack, a rocker member in the form of a yoke mounted on the shiftable pedal part, the arms of said yoke straddling said sprocket and frictionally engaging the sides thereof whereby said rocker is moved by a change in the direction of rotation of said sprocket, and electrical contacts actuated by the movement of said rocker.

15. Vehicle control means comprising a pedal mounted for up and down movement and for lateral movement in both directions from a normal central position, electrical contacts actuated by said lateral movement, a stationary member adjacent to said pedal having spaced side portions formed with mutually facing teeth, a pair of pawls mounted on the pedal, one at each side thereof, one of said pawls engaging one of said toothed portions when the pedal is shifted laterally, and said pawls and said teeth being formed to shift the pedal to normal lateral position when it is moved down.

16. Vehicle control means comprising a pedal mounted for up and down movement and for lateral movement in both directions from a normal central position, electrical contacts actuated by said lateral movement, a stationary member adjacent to said pedal having a central portion formed with rack teeth and spaced side portions formed with mutually facing teeth, a sprocket carried by the pedal for engagement with said rack teeth, a rocker mounted on the pedal and connected with said sprocket whereby it is rocked by a change in the direction of rotation of said sprocket, electrical contacts actuated by the movement of said rocker, a pair of pawls mounted on the pedal, one at each side thereof, one of said pawls engaging one of said toothed portions when the pedal is shifted laterally, and said pawls and said teeth being formed to shift the pedal to normal lateral position when it is moved down.

17. Vehicle control means comprising a pedal mounted for up and down movement and for lateral movement in both directions from a normal central position, electrical contacts actuated by said lateral movement, a stationary member adjacent to said pedal having three vertical racks, the central rack having horizontal teeth and the side racks having teeth sloping downwardly toward the central rack, three sprockets mounted on the pedal for respective engagement with said racks, the side sprockets engaging their respective side racks only when the pedal is moved laterally away from its normal position, and pawls engaging said sprockets to prevent rotation thereof when the pedal is moved downwardly, whereby it is returned to said normal position by the sloping teeth of said side racks.

18. Vehicle control means comprising a pedal mounted for up and down movement and for lateral movement in both directions from a normal central position, electrical contacts actuated by said lateral movement, a stationary member adjacent to said pedal having three vertical racks, the central rack having horizontal teeth and the side racks having teeth sloping downwardly toward the central rack, three sprockets mounted on the pedal for respective engagement with said racks, the side sprockets engaging their respective side racks only when the pedal is moved laterally away from its normal position, pawls engaging said sprockets to prevent rotation thereof when the pedal is moved downwardly, whereby it is returned to said normal position by the sloping teeth of said side racks, a rocker mounted on the pedal and connected with the central sprocket, said rocker being moved by a change in the direction of rotation of said central sprocket, and electrical contacts actuated by the movement of said rocker.

HERBERT H. ROBSON.